United States Patent
He (10) Patent No.: US 11,941,207 B2
(45) Date of Patent: Mar. 26, 2024

(54) TOUCH CONTROL METHOD FOR DISPLAY, TERMINAL DEVICE, AND STORAGE MEDIUM

(71) Applicant: SHENZHEN TCL NEW TECHNOLOGY CO., LTD., Guangdong (CN)

(72) Inventor: Kang He, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,254

(22) PCT Filed: Aug. 25, 2020

(86) PCT No.: PCT/CN2020/111041
§ 371 (c)(1),
(2) Date: Jun. 30, 2022

(87) PCT Pub. No.: WO2021/135288
PCT Pub. Date: Jul. 8, 2021

(65) Prior Publication Data
US 2023/0025945 A1    Jan. 26, 2023

(30) Foreign Application Priority Data
Dec. 31, 2019 (CN) .......................... 201911424297.3

(51) Int. Cl.
*G06F 3/042* (2006.01)
*G06F 3/01* (2006.01)
*G06F 3/041* (2006.01)

(52) U.S. Cl.
CPC ............ *G06F 3/0421* (2013.01); *G06F 3/017* (2013.01); *G06F 3/0416* (2013.01)

(58) Field of Classification Search
CPC ...... G06F 3/0421; G06F 3/017; G06F 3/0416; G06F 3/04883; G06F 3/042; G06V 40/20; G06V 40/28
See application file for complete search history.

(56) References Cited

U.S. PATENT DOCUMENTS

2014/0055566 A1* 2/2014 Hsu ....................... G06V 10/143
                                                                 348/46
2014/0353467 A1   12/2014 Spears
(Continued)

FOREIGN PATENT DOCUMENTS

CN    101236657 A    8/2008
CN    101634919 A    1/2010
(Continued)

OTHER PUBLICATIONS

Moving Object Detection Based on Omproved Three Frame Difference and Background Substraction, by Xu, 2017, hereinafter, Xu (Year: 2017).*

(Continued)

*Primary Examiner* — Grant Sitta
(74) *Attorney, Agent, or Firm* — PV IP PC; Wei Te Chung; Zhigang Ma (57) ABSTRACT

Disclosed is a touch control method for a display. The method includes: after a reflection signal is received by means of a receiving component of a laser sensor, generating an image according to a laser signal and the reflection signal; acquiring gesture information of a user according to the image; and executing a control operation corresponding to the gesture information. Further disclosed are a terminal device and a computer-readable storage medium.

19 Claims, 3 Drawing Sheets

(56) References Cited

U.S. PATENT DOCUMENTS

2015/0185321 A1* 7/2015 Nishioka .............. G06F 3/0425
                                                    356/445
2020/0143154 A1* 5/2020 Ette ..................... G06F 3/017

FOREIGN PATENT DOCUMENTS

| CN | 102523395 A | 6/2012 |
| CN | 104331193 A | 2/2015 |
| CN | 105807989 A | 7/2016 |
| CN | 209283349 U | 8/2019 |
| CN | 111078018 A | 4/2020 |
| EP | 3460636 A1 | 3/2019 |
| WO | 2017030397 A1 | 2/2017 |

OTHER PUBLICATIONS

International Search Report in International application No. PCT/CN2020/111041, dated Nov. 25, 2020.
Written Opinion of the International Search Authority in International application No. PCT/CN2020/111041, dated Nov. 25, 2020.
Chinese Office Action issued in corresponding Patent Application No. 201911424297.3 dated Aug. 4, 2021, pp. 1-6.
Chinese Office Action issued in corresponding Patent Application No. 201911424297.3 dated Feb. 8, 2022, pp. 1-7.
European Search Report in European application No. 20910921.4, dated Dec. 14, 2023.

* cited by examiner

TOUCH CONTROL METHOD FOR DISPLAY, TERMINAL DEVICE, AND STORAGE MEDIUM

CROSS REFERENCE TO RELATED APPLICATION

The present application claims a priority to Chinese patent application No. 201911424297.3, filed on Dec. 31, 2019, titled "TOUCH CONTROL METHOD FOR DISPLAY, TERMINAL DEVICE, AND STORAGE MEDIUM", which is incorporated by reference in the present application in its entirety.

FIELD OF INVENTION

The present application relates to the technical field of touch display, and especially to a touch control method for a display, a terminal device, and a storage medium.

BACKGROUND OF INVENTION

With development of display technology, touch screen products are widely used in our daily life, such as touch screen mobile phones, touch screen karaoke devices, touch screen numbering machines, etc. However, existing display devices having no touch functions need to have display screens replaced in order to implement touch functions, which is costly.

The above content is only used to assist in understanding of the technical solutions of the present application, and does not represent an admission that the above content is the prior art.

SUMMARY OF INVENTION

A main object of embodiments of the present application is to provide a touch control method for a display, which aims to solve the technical problem of high cost when an existing display device needs to replace display screen when realizing touch function.

In order to solve the above mentioned problem, an embodiment of the present application provides a touch control method for a display, comprising the following:
 after a reflection signal being received by means of a receiving component of a laser sensor, generating an image according to a laser signal and the reflection signal;
 acquiring gesture information of a user according to the image; and
 executing a control operation corresponding to the gesture information.

In an embodiment, the step of acquiring the gesture information of the user according to the image comprises:
 acquiring coordinate information of each pixel in the image;
 deleting pixels with coordinate information beyond a preset area in the image to obtain an updated image; and
 acquiring the gesture information of the user according to the updated image.

In an embodiment, the step of acquiring the gesture information of the user according to the image comprises:
 acquiring a plurality of the images generated within a preset time interval;
 acquiring an action area of the user of each of the images, wherein the action area is determined according to adjacent images;
 acquiring a centroid of the action area of each of the images; and
 acquiring the gesture information of the user according to the centroid of the action area of each of the images.

In an embodiment, the step of acquiring the centroid of the action area comprises:
 acquiring a coordinate of each pixel in the action area of the image;
 acquiring an average value of the coordinate of each pixel in the action area of the image; and
 taking the average value as the centroid of the action area of the image.

In an embodiment, the touch control method for the display further comprises:
 acquiring size information of the display screen;
 acquiring a center position of the laser sensor, and acquiring a distance from the center position of the laser sensor to a center position of the display screen;
 determining a coordinate range of the preset area according to the center position of the laser sensor, the distance, and the size information of the display screen.

In an embodiment, the touch control method for the display further comprises:
 Acquiring an area of the preset area according to the coordinate range;
 acquiring an area of the display screen according to the size information of the display screen; and
 when the area of the preset area is larger than the area of the display screen, outputting a prompt message that the preset area is set incorrectly.

In an embodiment, the touch control method for the display further comprises:
 detecting coordinates of a plurality of preset positions of the display by means of the laser sensor; and
 determining a coordinate range of the preset area according to the coordinates of the plurality of preset positions and a center position of the laser sensor.

In an embodiment, the step of executing the control operation corresponding to the gesture information comprises:
 acquiring position information and motion information corresponding to a currently displayed interface on the display according to the gesture information; and
 executing a corresponding control operation according to the position information and the motion information.

In addition, in order to solve the above problem, an embodiment of the present application also provides a terminal device, the terminal device comprises a processor, a memory, and a touch control program of the display that is stored in the memory and is executable on the processor, when the touch control program of the display is executed by the processor, the steps of the above-mentioned touch control method for the display are implemented.

Embodiments of the present application further provide a computer-readable storage medium, a touch control program of a display is stored on the computer-readable storage medium, when the touch control program of the display is executed by a processor, the steps of the above-mentioned touch control method for the display are realized.

Embodiments of the present application provides the touch control method for the display, the reflection signal is received by means of the receiving component of the laser sensor, acquiring the gesture information of the user according to the reflection signal and the laser signal; and executing the control operation corresponding to the gesture information, realizing touch function of non-touch screen without replacing the display, which has beneficial effects of low cost and fast response.

The realization, functional characteristics, and advantages of the objects of the present application will be further described with reference to the accompanying drawings in conjunction with the embodiments.

DETAILED DESCRIPTION OF PREFERRED EMBODIMENTS

It should be understood that the specific embodiments described herein are only used to explain the present application, but not to limit the present application.

A main solution of an embodiment of the present application is: after a reflection signal is received by means of a receiving component of a laser sensor, generating an image according to a laser signal and the reflection signal; acquiring gesture information of a user according to the image; and executing a control operation corresponding to the gesture information.

Since a display device without touch function in the prior art needs to replace a display screen in order to realize the touch function, there is a technical problem with a high cost.

An embodiment of the present application provides a solution. The reflection signal is received by means of the receiving component of the laser sensor, acquiring the gesture information of the user according to the reflection signal and the laser signal; executing the control operation corresponding to the gesture information, and realizing the touch function of a non-touch screen without replacing the display, which has beneficial effects of low cost and fast response.

Figure 1:
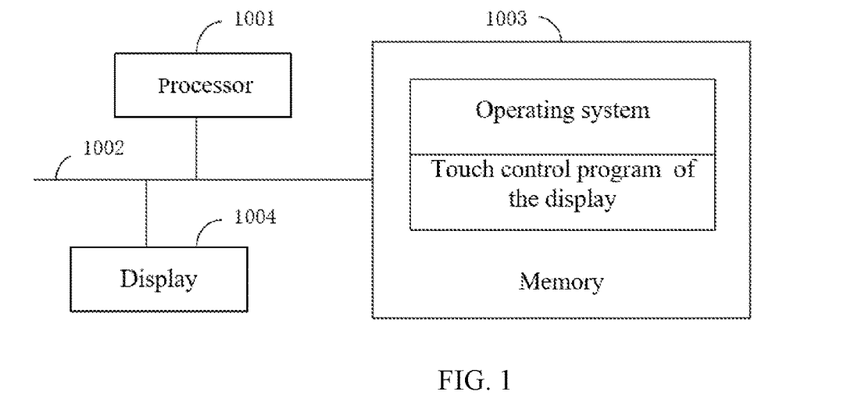
FIG. 1 is a schematic structural diagram of a terminal of a hardware operating environment involved in a solution according to an embodiment of the present application.

As shown in FIG. 1, FIG. 1 is a schematic structural diagram of a terminal of a hardware operating environment involved in a solution according to an embodiment of the present application.

An execution subject of the embodiment of the present application may be a terminal device with a display, such as a TV, a computer, a game machine, and an automatic teller machine.

As shown in FIG. 1, the terminal device may comprise: a processor 1001, e.g. CPU, a communication bus 1002, a memory 1003, and a display 1004. Wherein, the communication bus 1002 is used to realize connected communication among these components. The memory 1003 may be a high-speed RAM memory, or a stable memory (non-volatile memory), such as a disk memory. In an embodiment, the memory 1003 may also be a storage device independent of the aforementioned processor 1001. The display 1004 may comprise the display screen (Display).

Those skilled in the art may understand that the structures of the terminal device shown in FIG. 1 does not constitute a limitation to the terminal device, and may comprise more or fewer components than those shown in the figure, or combine some components, or have different component arrangement.

As shown in FIG. 1, the memory 1003 as a computer storage medium may comprise an operating system and a touch control program of the display, the processor 1001 may be used to call the touch control program of the display stored in the memory 1003, and perform the following steps:
after a reflection signal being received by means of a receiving component of a laser sensor, generating an image according to a laser signal and the reflection signal;
acquiring gesture information of a user according to the image; and
executing a control operation corresponding to the gesture information.

Further, the processor 1001 may be used to call the touch control program of the display stored in the memory 1003, and perform following steps:
acquiring coordinate information of each pixel in the image;
deleting the pixels with coordinate information beyond a preset area in the image to obtain an updated image;
acquiring the gesture information of the user according to the updated image.

Further, the processor 1001 may be used to call the touch control program of the display stored in the memory 1003, and perform following steps:
acquiring a plurality of the images generated within a preset time interval;
acquiring an action area of the user of each of the images, wherein the action area is determined according to adjacent images;
acquiring a centroid of the action area of each of the images;
acquiring the gesture information of the user according to the centroid of the action area of each of the images.

Further, the processor 1001 may be used to call the touch control program of the display stored in the memory 1003, and perform following steps:
acquiring a coordinate of each pixel in the action area of the image;
acquiring an average value of the coordinate of each pixel in the action area of the image;
taking the average value as the centroid of the action area of the image.

Further, the processor 1001 may be used to call the touch control program of the display stored in the memory 1003, and perform following steps:
acquiring size information of the display screen;

acquiring a center position of the laser sensor, and acquiring a distance from the center position of the laser sensor to a center position of the display screen;

determining a coordinate range of the preset area according to the center position of the laser sensor, the distance, and the size information of the display screen.

Further, the processor 1001 may be used to call the touch control program of the display stored in the memory 1003, and perform following steps:

acquiring an area of the preset area according to the coordinate range;

acquiring an area of the display screen according to the size information of the display screen;

when the area of the preset area is larger than the area of the display screen, outputting a prompt message that the preset area is set incorrectly.

Further, the processor 1001 may be used to call the touch control program of the display stored in the memory 1003, and perform following steps:

detecting coordinates of a plurality of preset positions of the display by means of the laser sensor;

determining a coordinate range of the preset area according to the coordinates of the plurality of preset positions and the center position of the laser sensor.

Further, the processor 1001 may be used to call the touch control program of the display stored in the memory 1003, and perform following steps:

acquiring position information and motion information corresponding to a currently displayed interface on the display according to the gesture information;

executing a corresponding control operation according to the position information and the motion information.

Figure 2:
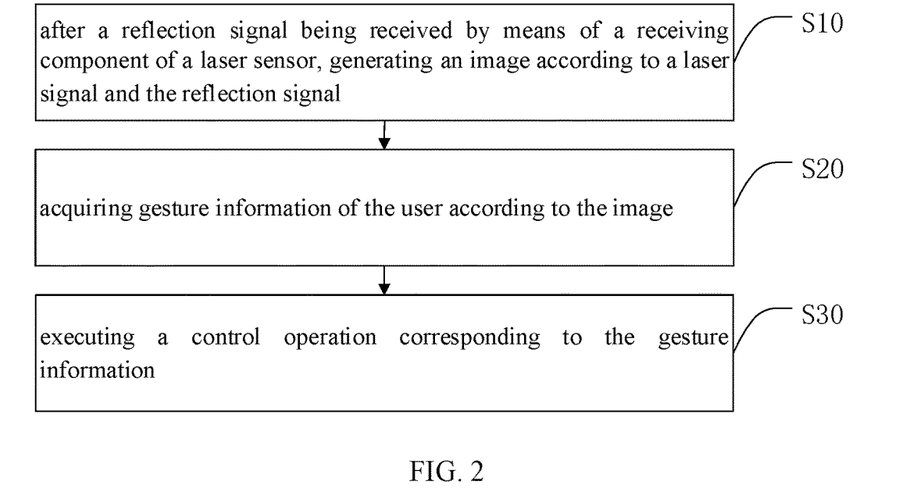
FIG. 2 is a schematic flowchart of a first embodiment of a touch control method for a display of the present application.

Based on the structures of the above-mentioned terminal, a first embodiment of the present application is proposed, referring to FIG. 2, FIG. 2 is a schematic flowchart of the first embodiment of a touch control method for a display of the present application, the touch control method for the display comprises following steps:

Step S10, after a reflection signal being received by means of a receiving component of a laser sensor, generating an image according to a laser signal and the reflection signal;

with development of the display, a touch screen has been widely used in electronic products, but an existing touch screen is relatively fragile, a surface is easily damaged, and price is relatively expensive. In addition, many terminal devices still use non-touch screens, and cannot be replaced in a short time. If a touch interactive function is to be realized on a non-touch screen, the screen needs to be replaced, which has a problem of high cost.

The present embodiment realizes the touch function in the non-touch screen without replacing the screen. An execution subject of the present embodiment is a terminal device, wherein the terminal device may be the terminal device with the display, such as a TV, a computer, a game machine, and an automatic teller machine.

The terminal device may comprise the display. The display comprises a display screen for displaying images or for playing videos. The display screen may be the touch screen or the non-touch screen, which is not limited herein.

In an embodiment, the laser sensor may be disposed in a terminal device, and is an integrated device with the terminal device; the laser sensor may also be an external component, and is disposed in the terminal device when necessary.

The laser sensor comprises a scanning component and a receiving component. The scanning component comprises an emission light source and a driving motor, wherein the emission light source is used to emit laser signal, the laser signal may be laser beam; the driving motor is used to drive the emission light source to rotate, so that emitted laser signal is in a same plane, thereby realizing scanning and ranging of a surrounding environment. It may be understood that an irradiated area of the laser sensor is centered on the emission light source and consists of a plane where the laser beam is emitted around. A distance of emission of the laser signal may be adjusted by adjusting power of the emission light source.

The receiving component is used to receive the reflection signal, wherein the reflection signal is the laser signal that is reflected back after the laser signal is irradiated on an object. It may be understood that due to a time difference between emission of the laser signal and reception of the reflection signal, a distance between the emission light source and the object may be calculated in combination with a propagation speed of light in the air.

In an embodiment, the emission light source may be a low-power infrared laser, which may ensure safety of human beings and animals, and is driven by a modulated pulse mode, so that an emission action may be performed in a very short time.

The laser sensor may be disposed on the display, a plane on which the laser signal emitted by the laser sensor is located is parallel to the display screen of the display.

In an embodiment, the plane on which the laser signal emitted by the laser sensor is located may overlap with the display screen of the display. In other words, the user may act on the display screen to realize the touch function of the terminal device.

When the user acts on the irradiated area of the laser sensor, the laser signal in the irradiated area may be reflected, and the laser signal may be reflected back, and the terminal device may receive the reflection signal by means of the receiving component of the laser sensor. After receiving the reflection signal, the terminal device may acquire the three-dimensional cloud data of the action area of the user according to the time difference between the reflection signal and the laser signal, as well as an angle between the reflection signal and the laser signal. Since the areas irradiated by the rotating laser signal are on the same plane, the data in one direction in the three-dimensional cloud data has a same value, so that the data in this direction may be removed to acquire two-dimensional data, and then generate the image.

Step S20, acquiring gesture information of the user according to the image;

the image may comprise blank pixels and non-blank pixels acted on by the user, and the gesture information of the user may be acquired according to the non-blank pixels. The gesture information may comprise at least one of the position information and the motion information. It may be understood that the position information may be acquired according to coordinates corresponding to the non-blank pixels; the motion information may be acquired according to a change of the area formed by the non-blank pixels in the consecutive images.

The position information may comprise position coordinates acted by the user; the motion information may comprise a movement track of the user, and control instructions of the user may be acquired through the movement track. The control instructions may comprise click, double click, drag, and select, etc. The terminal device may acquire an action position acting on a current display interface of the display according to the position information, and may acquire the control instruction of the user according to the motion information.

Step S30, executing a control operation corresponding to the gesture information.

After acquiring the gesture information of the user, acquiring the control instruction corresponding to the gesture information, and executing the control operation corresponding to the control instruction. The control operation may comprise one of single-click, double-click, drag, and selection.

In an embodiment, the terminal device may acquire the corresponding control instruction according to detected number of actions of the user and time of continuous action. If the user is detected to only appear once within a preset time, such as within 2 seconds, that is, after detecting the gesture information of the user, the user is not detected within the preset time, it may be determined that it is detected once, and it can be regarded as the single-click. If the user is detected to appear twice within the preset time, such as within 2 seconds, that is, it occurs twice from the detection of the gesture information of the user to the disappearance of the gesture information of the user, it can be regarded as the double-click. If the continuous action of the user is detected within the preset time, such as 2 seconds, and the position information moves in a certain direction and a speed, it can be regarded as the drag.

In an embodiment, the terminal device may convert the gesture information in the image into a mouse mapping event corresponding to the current display interface of the display, such as one of single-click, double-click, drag, and selection.

In an embodiment, executing the control operation corresponding to the gesture information comprises:
  acquiring position information and motion information corresponding to a currently displayed interface on the display according to the gesture information;
  executing the corresponding control operation according to the position information and the motion information.

It should be noted that a certain mapping relationship is between the image detected by the terminal device and the display screen of the display, and the action area of the user in the image can be converted into the corresponding position information and the motion information on the display interface on the display. The terminal device can acquire the position information and the motion information corresponding to the current display interface on the display according to the detected gesture information, acquire the action position and the control instruction of the current display interface according to the position information and the motion information, and execute the control operation corresponding to the control instruction. Executing the control operation corresponding to the gesture information of the user according to the mapping relationship between the image and the display interface of the display has beneficial effects of one-to-one correspondence and quick response.

In the present embodiment, after the reflection signal is received by means of the receiving component of the laser sensor, acquiring the gesture information of the user according to the reflection signal and the laser signal and executing the control operation corresponding to the gesture information, and realizing the touch function of the non-touch screen without replacing the screen, which has the beneficial effects of low cost and fast response.

Figure 3:
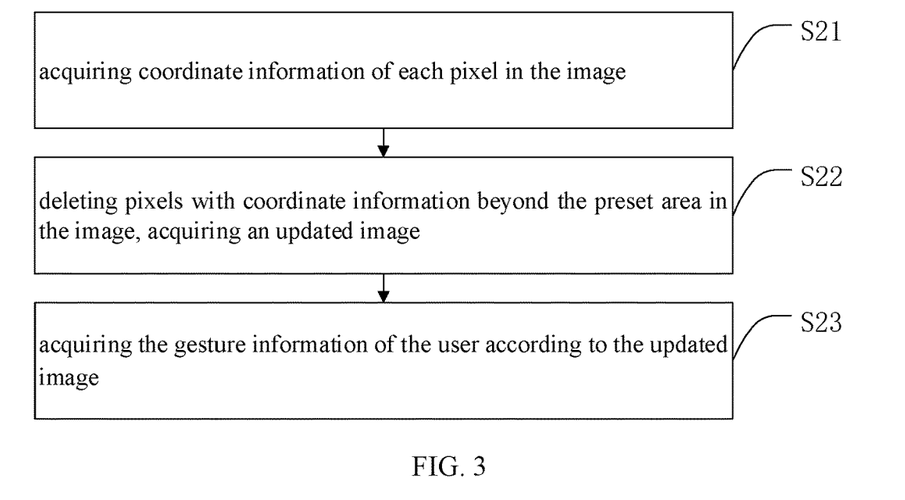
FIG. 3 is a schematic flowchart of a second embodiment of the touch control method for the display of the present application.

Referring to FIG. 3, FIG. 3 is a schematic flowchart of a second embodiment of the touch control method for the display of the present application, and FIG. 3 is also a detailed flowchart of the Step S20 in FIG. 2, based on the above-mentioned first embodiment, the Step S20 comprises:

Step S21, acquiring coordinate information of each pixel in the image;
Step S22, deleting pixels with coordinate information beyond the preset area in the image, acquiring an updated image;
Step S23, acquiring the gesture information of the user according to the updated image.

The image may comprise blank pixels and non-blank pixels after the user action. The preset area can be coordinate range of the pixels. The preset area can be preset by a designer according to a requirement, and it can be set by means of adjusting the position of the laser sensor and power of the scanning component.

Since an irradiation area of the laser sensor is parallel to a plane of the display screen, and the irradiation area is larger than the preset area, further, a part beyond the preset area can also be detected by the laser sensor. Therefore, it is necessary to filter out the pixels with the coordinate information beyond the preset area in the image, that is, delete the pixels with the coordinate information beyond the preset area in the image, so as to acquire the filtered image, that is, the updated image.

After acquiring the coordinate information of each pixel in the image, the terminal device deletes the pixels with coordinate information beyond the coordinate range of the preset area and may filter out irrelevant pixels, which has a smoothing effect on the image, acquires an updated image, and acquires the gesture information of user according to the updated image.

In the present embodiment, the pixels in the image beyond the coordinate range of the preset area can be filtered out so as to filter out the irrelevant pixels, the image can be smoothed so that the image can be processed more accurately, which has the beneficial effect of accurately recognizing the gesture information of the user.

Figure 4:
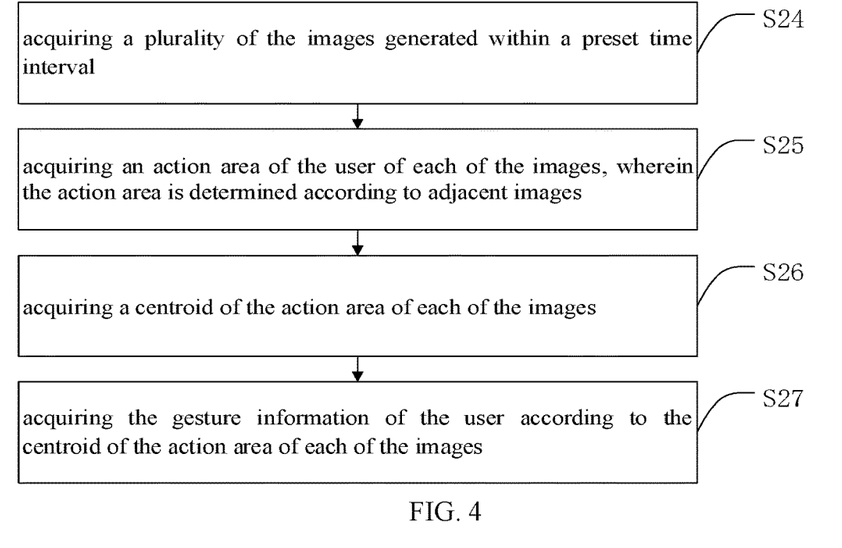
FIG. 4 is a schematic flowchart of a third embodiment of the touch control method for the display of the present application.

Referring to FIG. 4, FIG. 4 is a schematic flowchart of a third embodiment of the touch control method for the display of the present application. Based on the above-mentioned first embodiment or the above-mentioned second embodiment, FIG. 4 is also a detailed flowchart of the Step S20 in FIG. 2, the Step S20 further comprises:

Step S24, acquiring a plurality of the images generated within a preset time interval;
Step S25, acquiring an action area of the user of each of the images, wherein the action area is determined according to adjacent images;
the terminal device can generate the plurality of the images according to the reflection signal and the laser signal detected by the laser sensor within the preset time interval; wherein the preset time interval can be preset by a designer, such as within 1 second. It can be understood that when the user controls the display, there is a period of time in the irradiation area of the laser sensor, and the laser sensor emits laser light at a high frequency, which in turn can generate the plurality of the images.

After acquireing the plurality of the images, the terminal device compares a difference between the adjacent images to determine the action area of the user. The action area can be a position where the user acts on the irradiation area of the laser sensor and can comprise a plurality of the pixels.

In an embodiment, the action area of the user can be determined by means of a three-frame differential method, and changes of the action area of the user can be acquired by means of three adjacent consecutive images. The terminal device can make a difference between a first image and a second image to acquire a shape contour of an action area of a first group user, then make a difference between the second image and a third image to acquire a shape contour of an action area of a second group user. The shape contour of the action area of the first group user is "merged" with the shape contour of the action area of the second group user to determine the action area of the user in a current image.

Similarly, an action area of the user of each of the images can be acquired.

Step S26, acquiring a centroid of the action area of each of the images;

after the terminal device acquires the action area of each of the images, the centroid of the action area can be obtained. The centroid can be a center point of the action area. Similarly, the centroid of the action area of the user in each of the images can be acquired.

In an embodiment, acquiring the centroid of the action area comprises:
acquiring a coordinate of each pixel in the action area of the image;
acquiring an average value of the coordinate of each pixel in the action area of the image;
taking the average value as the centroid of the action area of the image.

The terminal device can acquire the coordinate of each pixel in the action area, and calculate the average value of the coordinate of each pixel. It can be understood that a ratio of a sum of the coordinates of each pixel on a same axis to a total number of the pixels is an average value of the axis. Similarly, an average value on another axis can be obtained. The coordinate composed of the average values of the two axes of the action area is the centroid of the action area of the image. The action area of the user can be replaced by the centroid, so as to accurately acquire a motion trail of the centroid, and then accurately acquire the gesture information of the user.

Step S27, acquiring the gesture information of the user according to the centroid of the action area of each of the images.

After the terminal device acquires the centroid of the action area of each of the images, the gesture information of the user according to a position change or a motion trail of the centroid in a time sequence is acquired. It should be noted that the coordinate of the centroid can be an action position of the user, which can convert the coordinate of the centroid into a position of the current display interface in the display.

In the present embodiment, by generating the plurality of the images, it determines the action area of the user according to the adjacent images and acquires the centroid of the action area in each of the images, acquires the gesture information of the user according to the centroid of the action area of each of the images; by replacing the action area of the user with the centroid, the action position and the motion trail of the user can be accurately acquired, thereby improving a beneficial effect of acquiring accuracy of the gesture information of the user.

Figure 5:
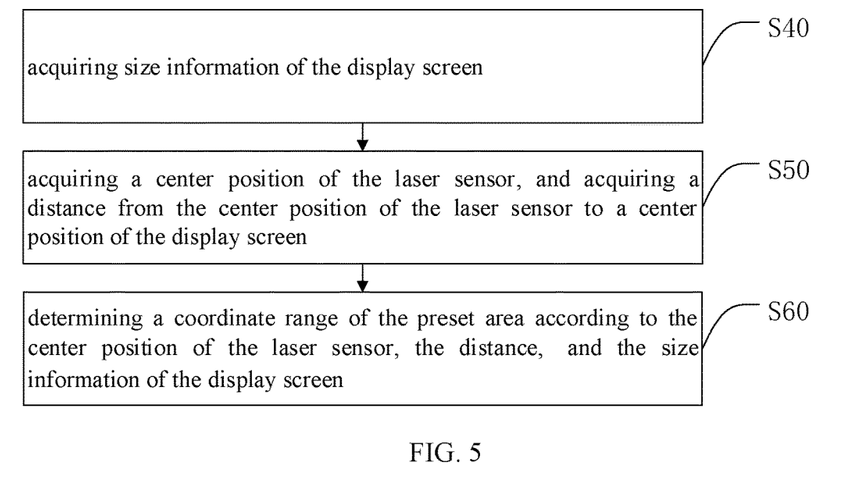
FIG. 5 is a schematic flowchart of a fourth embodiment of the touch control method for the display of the present application.

Refer to FIG. 5, FIG. 5 is a schematic flowchart of a fourth embodiment of the touch control method for the display of the present application. Based on any embodiment of the first embodiment to the third embodiment, the touch control method for the display also comprises:

Step S40, acquiring size information of the display screen;

Step S50, acquiring a center position of the laser sensor, and acquiring a distance from the center position of the laser sensor to a center position of the display screen;

Step S60, determining a coordinate range of the preset area according to the center position of the laser sensor, the distance, and the size information of the display screen.

In the present embodiment, the terminal device can determine the coordinate range of the preset area according to the size information of the display screen, which can make the preset area overlap with the display area of the display screen. The terminal device can acquire the size information of the display screen in the configuration information according to the configuration information of the display. Wherein the size information can comprise a width W and height H of the display.

The terminal device acquires the center position of the laser sensor, wherein the center position of the sensor can be a position of the emission light source in the scanning component. The terminal device can acquire a distance d from the center position of the laser sensor to the center position of the display screen. Wherein the center position of the display screen is a position of a center point of the display screen.

The terminal device takes the center position of the laser sensor as an origin, a straight line that is parallel to the width of the display screen as an X-axis, a positive direction as a rightward direction, a straight line that is parallel to the height of the display screen as a Y-axis, and a positive direction as the direction from the origin to the display screen of the display to establish a plane right angle coordinate system. Since the preset area overlaps with the display area of the display screen, a starting coordinate of an upper left corner of the preset area is thereby obtained. Taking the starting coordinate of the upper left corner of the preset area as the starting point, the width of the display screen as the range of the coordinates of the preset area on the X-axis, and the height of the display screen as the range of the coordinates of the preset area on the Y-axis, the range of the coordinates of the preset area can be obtained.

The starting coordinate of the upper left corner of the preset area can be (−W/2, −H/2+d), and then a value range of the preset area on the X-axis is from −W/2 to W/2. The value range of the preset area on the Y-axis is from −H/2+d to −H/2+d+H.

In an embodiment, the terminal device can perform grid processing on the preset area, so that a size of a grid is same as a size of the pixel of the display screen, and convert grids in the preset area into the pixels. In this way, the action area that the user acts on the irradiation area of the laser sensor can be distributed on the pixels of the preset area, and the pixels of the action area of the user can be converted into corresponding pixels in the display screen by a form of matrix conversion. In this way, the terminal device can obtain the action area corresponding to the action area of the user in the display screen, thereby implementing corresponding control instructions according to the gesture information of the user. Further, physical size of the pixel in the preset area can be obtained according to resolution of the display screen.

Furthermore, the configuration information can also comprise resolution ($S_W$, $S_H$) of the display screen, that is, resolution in a direction of the width of the display screen is $S_W$, and resolution in a direction of the height of the display screen is $S_H$. Since resolution of the preset area is same as the resolution of the display screen, a width of the pixel in the preset area is $W/S_W$; a height of the pixel in the preset area is $H/S_H$.

Further, the physical size of the pixel in the preset area can be adjusted, there is an adjustment parameter α, then, correspondingly, the width of the pixel in the preset area is $\alpha*W/S_W$ and the height of the pixel in the preset area is $\alpha*H/S_H$. When $\alpha>1$, the resolution and precision are high, a response speed is slow in the preset area. When $\alpha<1$, the resolution and the precision are low, the response speed is fast in the preset area. Combining the resolution and the response speed, when $\alpha=1$, the resolution of the preset area is more appropriate and the response speed is also faster.

In an embodiment, the touch control method for the display further comprises:
  acquiring area of the preset area according to the coordinate range;
  acquiring area of the display screen according to the size information of the display screen;
  when the area of the preset area is larger than the area of the display screen, outputting a prompt message that the preset area is set incorrectly.

Since the preset area is a rectangle, the terminal device can acquire the area of the preset area according to the coordinate range, and acquire the area of the display screen according to the size information of the display screen, that is, multiply the width and height. When the area of the preset area is larger than the area of the display screen, that is, the preset area exceeds the display screen, a prompt message that the preset area is set incorrectly can be displayed on the current display interface of the display screen, which can be displayed in a form of a pop-up dialog box.

In the present embodiment, the coordinate range of the preset area is determined according to the size information of the display screen, the center position of the laser sensor, and the distance from the center position of the laser sensor to the center position of the display screen, so that the preset area overlaps with the display area of the display screen, and has beneficial effects of convenient and intuitive operation.

Figure 6:
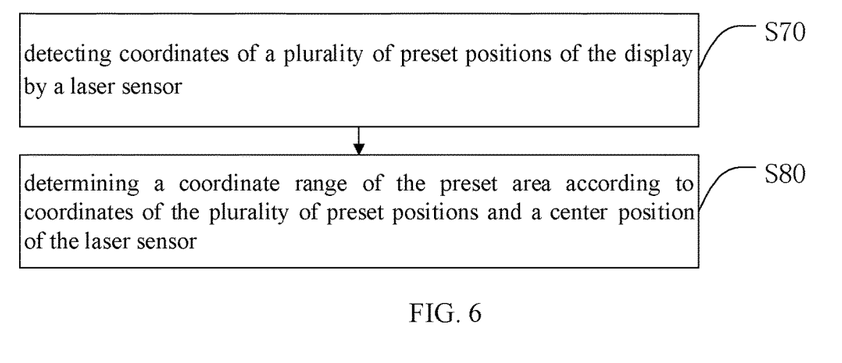
FIG. 6 is a schematic flowchart of a fifth embodiment of the touch control method for the display of the present application.
Figure 7:
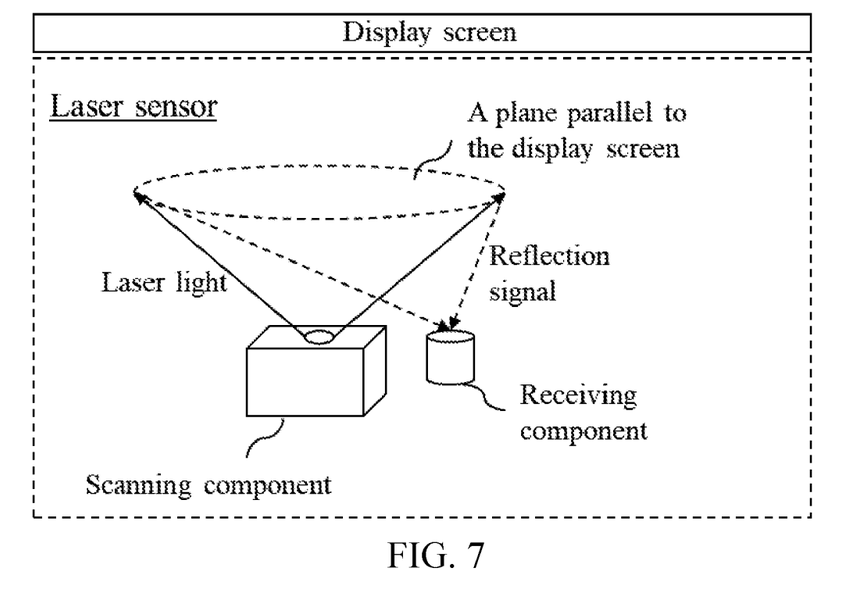
FIG. 7 is a schematic structural diagram of a display according to one or more embodiments of the present application.
Figure 8:
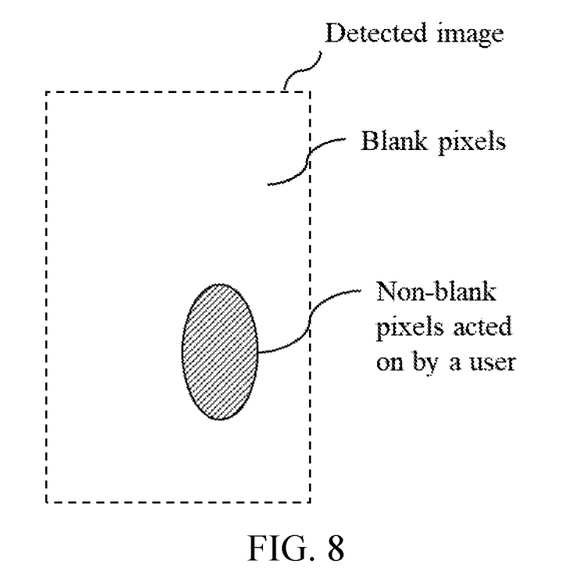
FIG. 8 is a schematic diagram of a detected image according to one or more embodiments of the present application.

Referring to FIG. 6, FIG. 6 is a schematic flowchart of a fifth embodiment of the touch control method for the display of the present application. Based on any embodiment of the above-mentioned first to third embodiments, it is a parallel embodiment with the above-mentioned fourth embodiment, so the touch control method for the display further comprises:
  Step S70, detecting coordinates of a plurality of preset positions of the display by a laser sensor;
  Step S80, determining a coordinate range of the preset area according to coordinates of the plurality of preset positions and a center position of the laser sensor.

When the terminal device cannot acquire configuration information of the display screen, the coordinates of the plurality of preset positions of the display can be detected by the laser sensor to obtain width and height of the display screen. Wherein, the preset position can be a position of a vertex of the display screen; number of preset positions can be greater than three. Taking the four vertices of the display screen as an example, coordinates of the four vertices can be detected by the laser sensor as $(x_1, y_1)$, $(x_2, y_2)$, $(x_3, y_3)$, and $(x_4, y_4)$, wherein a coordinate of the upper left corner is $(x_1, y_1)$. According to the coordinates of the four vertices, the width and the height of the display screen can be obtained, wherein the width W is a minimum value of $(x_4-x_3)$ and $(x_2-x_1)$, and the height H is a minimum value of $(y_4-y_3)$ and $(y_2-y_1)$.

The terminal device can calculate a distance d from the center position of the laser sensor to the center position of the display screen according to a coordinate of a starting point $(x_1, y_1)$, and a coordinate of a starting point $(-W/2, -H/2+d)$, and then determine the center position of the laser sensor.

The terminal device takes the center position of the laser sensor as an origin, a straight line that is parallel to the width of the display screen as an X axis, a positive direction as a rightward direction, a straight line that is parallel to the height of the display screen as a Y axis, and a positive direction as the direction from the origin to the display screen of the display to establish a plane right angle coordinate system.

The terminal device takes the starting coordinate of the upper left corner of the preset area as the starting point, the width of the display screen as the coordinate range of the preset area on the X-axis, and the height of the display screen as the coordinate range of the preset area on the Y-axis, and then can obtain the coordinate range of the preset area.

In the present embodiment, detecting the plurality of coordinates of the preset area by a laser detector, acquiring the size information of the display screen, and determining the coordinate range of the preset area according to the size information of the display screen and the center position of the laser sensor, so that the preset area overlaps with the display area of the display screen and determination of the preset area has a beneficial effect of universality.

Above-mentioned sequence numbers of the embodiments of the present application are only for description, and do not represent advantages or disadvantages of the embodiments.

It should be noted that, herein, the terms "comprising", "comprising" or any other variation thereof are intended to encompass non-exclusive inclusion, thus a process, method, article or apparatus comprising a series of elements comprises not only those elements, but also other elements not expressly listed, or elements inherent to such process, method, article or apparatus. Without further limitation, an element defined by the phrase "comprising a . . . " does not preclude the presence of additional identical elements in a process, method, article or apparatus that comprises the element.

From the description of the above embodiments, those skilled in the art can clearly understand that the methods of the above embodiments can be implemented by means of software plus a necessary general hardware platform, and of course hardware can also be used, but in many cases the former is better implementation. Based on such an understanding, the technical solutions of the present application can be embodied in the form of software products, which are essentially or contribute to the prior art. The computer software products are stored in the above-mentioned computer-readable storage medium (such as ROM/RAM, magnetic disk, optical disk), comprising several instructions to make a terminal device (which may be a mobile phone, a computer, a server, an air conditioner, or a network device, etc.) execute the methods described in the various embodiments of the present application.

The above are only the preferred embodiments of the present application, and are not intended to limit the scope of the patent of the present application. Any equivalent structure or equivalent process transformation made by using the contents of the description and drawings of the present application, or directly or indirectly applied in other related technical fields, are similarly comprised within the scope of patent protection of this application.

What is claimed is:

1. A touch control method for a display, wherein the display is provided with a laser sensor, the laser sensor comprises a scanning component and a receiving component, the scanning component is used to emit laser signal, the receiving component is used to receive reflection signal, a plane on which the laser signal is located is parallel to a display screen of the display, the touch control method for the display comprises: after the reflection signal is received by means of the receiving component of the laser sensor, generating an image according to the laser signal and the reflection signal; acquiring gesture information of a user according to the image; and executing a control operation corresponding to the gesture information;

wherein the acquiring of the gesture information of the user according to the image comprises:
        acquiring coordinate information of each pixel in the image;
        deleting pixels with coordinate information beyond a preset area in the image to obtain an updated image; and
        acquiring the gesture information of the user according to the updated image; and
    wherein the touch control method for the display further comprises:
    acquiring size information of the display screen;
    acquiring a center position of the laser sensor, and acquiring a distance from the center position of the laser sensor to a center position of the display screen; and
    determining a coordinate range of the preset area according to the center position of the laser sensor, the distance, and the size information of the display screen.

2. The touch control method for the display as claimed in claim 1, wherein the touch control method for the display further comprises:
    acquiring an area of the preset area according to the coordinate range;
    acquiring an area of the display screen according to the size information of the display screen; and
    when the area of the preset area is larger than the area of the display screen, outputting a prompt message that the preset area is set incorrectly.

3. The touch control method for the display as claimed in claim 1, wherein the executing of the control operation corresponding to the gesture information comprises:
    acquiring position information and motion information corresponding to a currently displayed interface on the display according to the gesture information; and
    executing a corresponding control operation according to the position information and the motion information.

4. The touch control method for the display as claimed in claim 1, wherein the touch control method for the display further comprises:
    converting the gesture information into a mouse mapping event corresponding to a display interface of the display.

5. The touch control method for the display as claimed in claim 4, wherein the mouse mapping event comprises one of single-click, double-click, drag, and selection.

6. A terminal device, wherein the terminal device comprises a display, a processor, a memory, and a touch control program of the display that is stored in the memory and is executable by the processor to perform the touch control method for the display as claimed in claim 1.

7. A non-transitory computer-readable storage medium, wherein a touch control program of a display is stored on the computer-readable storage medium and is executable by a processor to perform the touch control method for the display as claimed in claim 1.

8. A touch control method for a display, wherein the display is provided with a laser sensor, the laser sensor comprises a scanning component and a receiving component, the scanning component is used to emit laser signal, the receiving component is used to receive reflection signal, a plane on which the laser signal is located is parallel to a display screen of the display, the touch control method for the display comprises: after the reflection signal is received by means of the receiving component of the laser sensor, generating an image according to the laser signal and the reflection signal; acquiring gesture information of a user according to the image; and executing a control operation corresponding to the gesture information;

wherein the acquiring of the gesture information of the user according to the image comprises:
        acquiring coordinate information of each pixel in the image;
        deleting pixels with coordinate information beyond a preset area in the image to obtain an updated image; and
        acquiring the gesture information of the user according to the updated image; and
    wherein the touch control method for the display further comprises:
    detecting coordinates of a plurality of preset positions of the display by means of the laser sensor; and
    determining a coordinate range of the preset area according to the coordinates of the plurality of preset positions and a center position of the laser sensor.

9. The touch control method for the display as claimed in claim 8, wherein the executing of the control operation corresponding to the gesture information comprises:
    acquiring position information and motion information corresponding to a currently displayed interface on the display according to the gesture information; and
    executing a corresponding control operation according to the position information and the motion information.

10. The touch control method for the display as claimed in claim 8, wherein the touch control method for the display further comprises:
    converting the gesture information into a mouse mapping event corresponding to a display interface of the display.

11. The touch control method for the display as claimed in claim 10, wherein the mouse mapping event comprises one of single-click, double-click, drag, and selection.

12. A terminal device, wherein the terminal device comprises a display, a processor, a memory, and a touch control program of the display that is stored in the memory and is executable by the processor to perform the touch control method for the display as claimed in claim 8.

13. A non-transitory computer-readable storage medium, wherein a touch control program of a display is stored on the computer-readable storage medium and is executable by a processor to perform the touch control method for the display as claimed in claim 8.

14. A touch control method for a display, wherein the display is provided with a laser sensor, the laser sensor comprises a scanning component and a receiving component, the scanning component is used to emit laser signal, the receiving component is used to receive reflection signal, a plane on which the laser signal is located is parallel to a display screen of the display, the touch control method for the display comprises: after the reflection signal is received by means of the receiving component of the laser sensor, generating an image according to the laser signal and the reflection signal; acquiring gesture information of a user according to the image; and executing a control operation corresponding to the gesture information;

wherein the acquiring of the gesture information of the user according to the image comprises:

acquiring coordinate information of each pixel in the image;

deleting pixels with coordinate information beyond a preset area in the image to obtain an updated image; and acquiring the gesture information of the user according to the updated image; and wherein the touch control method for the display further comprises:

performing grid processing on the preset area, so that a size of a grid is same as a size of the pixel of the display screen, and converting grids in the preset area into pixels.

15. The touch control method for the display as claimed in claim 14, wherein the executing of the control operation corresponding to the gesture information comprises:

acquiring position information and motion information corresponding to a currently displayed interface on the display according to the gesture information; and executing a corresponding control operation according to the position information and the motion information.

16. The touch control method for the display as claimed in claim 14, wherein the touch control method for the display further comprises:

converting the gesture information into a mouse mapping event corresponding to a display interface of the display.

17. The touch control method for the display as claimed in claim 16, wherein the mouse mapping event comprises one of single-click, double-click, drag, and selection.

18. A terminal device, wherein the terminal device comprises a display, a processor, a memory, and a touch control program of the display that is stored in the memory and is executable by the processor to perform the touch control method for the display as claimed in claim 14.

19. A non-transitory computer-readable storage medium, wherein a touch control program of a display is stored on the computer-readable storage medium and is executable by a processor to perform the touch control method for the display as claimed in claim 14.

* * * * *